US012191071B2

(12) United States Patent
Nakada

(10) Patent No.: US 12,191,071 B2
(45) Date of Patent: Jan. 7, 2025

(54) WOUND MAGNETIC CORE

(71) Applicant: PROTERIAL, LTD., Tokyo (JP)

(72) Inventor: Tsugitomo Nakada, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/330,568

(22) Filed: Jun. 7, 2023

(65) Prior Publication Data

US 2023/0317368 A1 Oct. 5, 2023

Related U.S. Application Data

(62) Division of application No. 17/210,714, filed on Mar. 24, 2021, now Pat. No. 11,715,591.

(30) Foreign Application Priority Data

Mar. 27, 2020 (JP) ................................ 2020-058481
Feb. 25, 2021 (JP) ................................ 2021-028823

(51) Int. Cl.
*H01F 7/06* (2006.01)
*H01F 1/153* (2006.01)
(Continued)

(52) U.S. Cl.
CPC ..... *H01F 41/0246* (2013.01); *H01F 1/15308* (2013.01); *H01F 1/24* (2013.01);
(Continued)

(58) Field of Classification Search
CPC ........ H01F 1/15308; H01F 1/24; H01F 27/25; H01F 3/08; H01F 41/0226; H01F 41/0246
See application file for complete search history.

(56) References Cited

U.S. PATENT DOCUMENTS 4,081,298 A 3/1978 Mendelsohn
4,253,886 A 3/1981 Aonuma et al.
(Continued)

FOREIGN PATENT DOCUMENTS

EP 0 337 716 A2 10/1989
JP 63-110606 A 5/1988
(Continued)

OTHER PUBLICATIONS

Extended European Search Report dated Sep. 2, 2021 from the European Patent Office in EP application No. 21165206.0.
(Continued)

*Primary Examiner* — Paul D Kim
(74) *Attorney, Agent, or Firm* — Sughrue Mion, PLLC

(57) ABSTRACT

A nonmagnetic insulating metal oxide powder is made to adhere to a surface of a soft magnetic metal ribbon having an amorphous structure; this is wound in annular fashion and made into a wound body at which the metal oxide powder intervenes between ribbon layers; the wound body is made to undergo heat treatment in a nonoxidizing atmosphere; the wound body is thereafter subjected to treatment for formation of an oxide film in an oxidizing atmosphere adjusted to be at a temperature lower than that at the heat treatment to cause oxidation of the surface of the soft magnetic metal ribbon; and spaces between ribbon layers at the wound body are moreover impregnated with resin and curing is carried out to fuse the metal oxide powder thereto.

5 Claims, 5 Drawing Sheets

(51) Int. Cl.

| | |
|---|---|
| ***H01F 1/24*** | (2006.01) |
| ***H01F 3/08*** | (2006.01) |
| ***H01F 27/25*** | (2006.01) |
| ***H01F 41/02*** | (2006.01) |
| *H01F 41/068* | (2016.01) |

(52) U.S. Cl.

CPC ............... *H01F 3/08* (2013.01); *H01F 27/25* (2013.01); *H01F 41/0226* (2013.01); *H01F 41/068* (2016.01)

(56) References Cited

U.S. PATENT DOCUMENTS

| | | | | |
|---|---|---|---|---|
| 9,773,595 | B2 * | 9/2017 | Herzer | C22C 38/12 |
| 10,580,571 | B2 * | 3/2020 | Polak | F27B 17/0016 |
| 2006/0046103 | A1 | 3/2006 | Itoh | |
| 2008/0196795 | A1 | 8/2008 | Waeckerle et al. | |

FOREIGN PATENT DOCUMENTS

| | | | | | |
|---|---|---|---|---|---|
| JP | 01-259510 | A | | 10/1989 | |
| JP | 3-125408 | A | | 5/1991 | |
| JP | 03113715 | A | * | 5/1991 | |
| JP | 03125404 | A | * | 5/1991 | H01F 1/15383 |
| JP | 7-320920 | A | | 12/1995 | |
| JP | 10-199720 | A | | 7/1998 | |
| JP | 2003-500850 | A | | 1/2003 | |
| JP | 3424767 | B2 | | 7/2003 | |
| JP | 2010-229466 | A | | 10/2010 | |
| JP | 2011035006 | A | * | 2/2011 | |
| JP | 2016-197720 | A | | 11/2016 | |
| WO | 00/72334 | A1 | | 11/2000 | |

OTHER PUBLICATIONS

Office Action issued Mar. 6, 2023 in European Application No. 21 165 206.0.

European Office Action dated Sep. 26, 2023 in Application No. 21 165 206.0.

Extended European Search Report dated Jun. 28, 2024 in Application No. 24165879.8.

Notice of Reasons for Refusal dated Jul. 23, 2024 in Japanese Application No. 2021-028823.

Decision of Refusal in Japanese Patent Application No. 2021-028823 dated Oct. 15, 2024.

Office Action in People's Republic of China Patent Application No. 202110317886.2 dated Oct. 28, 2024.

* cited by examiner

WOUND MAGNETIC CORE

CROSS-REFERENCE TO RELATED APPLICATIONS

This application is a divisional application of U.S. application Ser. No. 17/210,714 filed Mar. 24, 2021, which claims priority to Japanese Patent Application No. 2020-058481 filed on Mar. 27, 2020 and Japanese Patent Application No. 2021-028823 filed on Feb. 25, 2021. The disclosure of U.S. application Ser. No. 17/210,714 is incorporated by reference herein in its entirety.

TECHNICAL FIELD

The present invention relates to a wound magnetic core and to a manufacturing method for a wound magnetic core.

BACKGROUND ART

Inductors, transformers, chokes, and other such coil components have conventionally been employed in varied and diverse applications which include household appliances, industrial equipment, vehicles, and so forth. Coil components are made up of coil(s) installed on magnetic core(s), wound magnetic cores which are wound bodies comprising amorphous and/or crystalline soft magnetic metal ribbon having superior magnetic properties being widely used as such magnetic cores.

The wound magnetic core is ordinarily formed by wrapping soft magnetic metal ribbon, also referred to as strip or ribbon, tightly about a support body (spool) while tension is applied thereto to produce an annular wound body at which multiple layers of soft magnetic metal ribbon are layered in the radial direction of the winding. To prevent the soft magnetic metal ribbon from coming loose from the wound body, the ends of the soft magnetic metal ribbon where the winding begins and ends may be secured by welding to the wound body while this is unattached to the support body. Alternatively, the end of the soft magnetic metal ribbon where the winding ends may be secured by welding to the wound body while this is still attached to the support body. To relieve stresses that may have been imparted thereto during formation of the wound body, and/or to carry out nanocrystallization so as to achieve the desired magnetic properties, this is then subjected to heat treatment. Following heat treatment, to prevent the soft magnetic metal ribbon from coming loose due to changes occurring with passage of time or due to external forces acting on the wound body, impregnation with epoxy resin or other such treatment may be carried out so as to cause the wound state to be maintained.

Thickness of the soft magnetic metal ribbon is extremely small, thickness thereof typically being 10 μm to several hundred Although surface irregularity of the soft magnetic metal ribbon is several μm, the surface thereof is macroscopically smooth. Because the soft magnetic metal ribbon is a good conductor, in the event that a short circuit forms between the smooth surfaces and the insulation between ribbon layers is inadequate, this might cause eddy currents to flow between ribbon layers, which could cause the wound magnetic core to experience a large electric power loss. This tendency is particularly noticeable in high-frequency applications above 100 kHz. Where the ribbon layers of a wound magnetic core are not properly electrically insulated from each other, that wound magnetic core will no longer be suitable as a coil component for use at high frequencies.

Conventionally proposed at Patent Reference No. 1 for obtaining a high degree of insulation between ribbon layers is formation of a wound magnetic core at which a powder comprising a nonmagnetic insulating inorganic substance has been made to adhere to the surfaces of the magnetic metal ribbon. It is proposed at Patent Reference No. 2 that oxidation of the magnetic metal ribbon be carried out so as to form an insulating layer comprising iron oxide between layers.

PRIOR ART REFERENCES

Patent References

Patent Reference No. 1: Japanese Patent Application Publication Kokai No. H01[1989]-259510

Patent Reference No. 2: International Patent Application Japanese Translation Publication No. 2003-500850

SUMMARY OF INVENTION

Problem to be Solved by Invention

Depending on the environment in which it is used, it will sometimes be the case that a coil component will experience a high surge voltage as a result of a lightning strike or the like. It is to be desired that such a coil component will not suffer dielectric breakdown due to voltage oscillations occurring when the coil component experiences the surge voltage. Impulse testing is sometimes carried out to ascertain the dielectric strength of the coil component. During impulse testing, a high-voltage, i.e., on the order of several kV, narrow voltage pulse having a rise time of several hundred ns or less is applied across the two ends of the coil in the coil component.

When impulse testing is performed, the sudden change in magnetic flux occurring at the wound magnetic core causes the ribbon to experience magnetostrictive oscillations. Notwithstanding the fact that a wound magnetic core might have been constituted with the goal of achieving a high degree of insulation between ribbon layers as at Patent Reference No. 1 and Patent Reference No. 2, it has nevertheless been found that it is sometimes the case that following impulse testing the wound magnetic core will have short circuits between ribbon layers or otherwise exhibit deterioration in insulation between layers. Where ability to withstand surge voltages is sought in a coil component, such a coil component will be unsuited for use at high frequency even if this does not reach the point of causing occurrence of dielectric breakdown.

A person wishing to achieve a high degree of insulation between ribbon layers might further increase the thickness with which a powder comprising an insulating inorganic substance is made to adhere to the ribbon or might cause a thick insulating layer that contains iron oxide to be formed on the ribbon in an attempt to increase the spacing between ribbon layers. However, as this will reduce the space factor (also referred to as the packing factor) of the wound magnetic core, it may cause the wound magnetic core to increase in size such that the predetermined dimensional specifications of the coil component are no longer capable of being met. And in those situations where it has been possible to cause the wound magnetic core to be constituted so as to have prescribed dimensions, it has sometimes been the case that it was not possible to attain the desired magnetic properties.

It is therefore an object of the present invention to provide a wound magnetic core and a method for manufacturing a wound magnetic core permitting improvement of insulation between ribbon layers in a wound magnetic core at which soft magnetic metal ribbon has been wound to form an annular wound body.

Means for Solving Problem

In accordance with one embodiment of the present invention, a method for manufacturing a wound magnetic core may be provided which comprises a first operation in which a nonmagnetic insulating metal oxide powder is made to adhere to a surface of a soft magnetic metal ribbon having an amorphous structure; a second operation in which, following the first operation, the soft magnetic metal ribbon is wound in annular fashion to obtain a wound body at which the metal oxide powder intervenes between layers of the ribbon; a third operation in which the wound body is made to undergo heat treatment in a nonoxidizing atmosphere; a fourth operation in which, following the third operation, the wound body is subjected to treatment for formation of an oxide film in an oxidizing atmosphere at a temperature lower than a heat treatment temperature at the third operation to cause oxidation of the surface of the soft magnetic metal ribbon; and a fifth operation in which, following the fourth operation, spaces between the layers of the ribbon of the wound body are impregnated with resin and curing thereof is carried out.

In accordance with one embodiment of the present invention, it is preferred that the third operation be heat treatment A that causes formation of nanocrystals at the soft magnetic metal ribbon having the amorphous structure and/or be heat treatment B that relieves stresses at the soft magnetic metal ribbon having the amorphous structure.

In accordance with one embodiment of the present invention, it is preferred that a temperature at the heat treatment of the third operation be not less than 450° C. but not greater than 620° C. for the heat treatment A and/or be not less than 250° C. but not greater than 400° C. for the heat treatment B.

In accordance with one embodiment of the present invention, it is preferred that an amount of the metal oxide powder which is made to adhere thereto at the first operation be not less than 0.1% but not greater than 1.2% when expressed as a metal oxide powder wt % ratio as obtained using the following formula (1).

$$\text{Metal oxide wt \% ratio (\%)} = (\text{weight of metal oxide adhering to soft magnetic metal ribbon})/\text{weight of soft magnetic metal ribbon})\times 100 \quad (1)$$

In accordance with one embodiment of the present invention, it is preferred that the oxide film forming treatment at the fourth operation be carried out in an oxidizing atmosphere at a temperature that is not less than 240° C. but less than the heat treatment temperature at the third operation.

In accordance with another embodiment of the present invention, a wound magnetic core may be provided in which a soft magnetic metal ribbon is wound, the wound magnetic core being such that the soft magnetic metal ribbon has an amorphous structure and/or a nanocrystalline structure; a layer of an oxide of Fe derived from a metal making up the soft magnetic metal ribbon is present at a surface of the soft magnetic metal ribbon; spaces between layers of the soft magnetic metal ribbon have a nonmagnetic insulating metal oxide powder present therein in intervening fashion and are impregnated with resin; and a space factor thereof is not less than 65% but not greater than 75%.

In accordance with another embodiment of the present invention, it is preferred that the Fe oxide layer comprise hematite ($Fe_2O_3$).

In accordance with another embodiment of the present invention, it is preferred that an absolute value of a percent change in impedance at a frequency of 1 MHz as obtained using the following formula (2) be not greater than 20%.

$$\text{Percent change in impedance (\%)} = \{(\text{impedance before impulse testing} - \text{impedance after impulse testing})/\text{impedance before impulse testing}\}\times 100 \quad (2)$$

Benefit of Invention

The present invention makes it possible to provide a wound magnetic core and a method for manufacturing a wound magnetic core permitting improvement of insulation between ribbon layers in a wound magnetic core at which soft magnetic metal ribbon has been wound to form an annular wound body.

EMBODIMENTS FOR CARRYING OUT INVENTION

Although embodiments of the present invention are described below in concrete terms, the present invention is not limited thereto.

Figure 1:
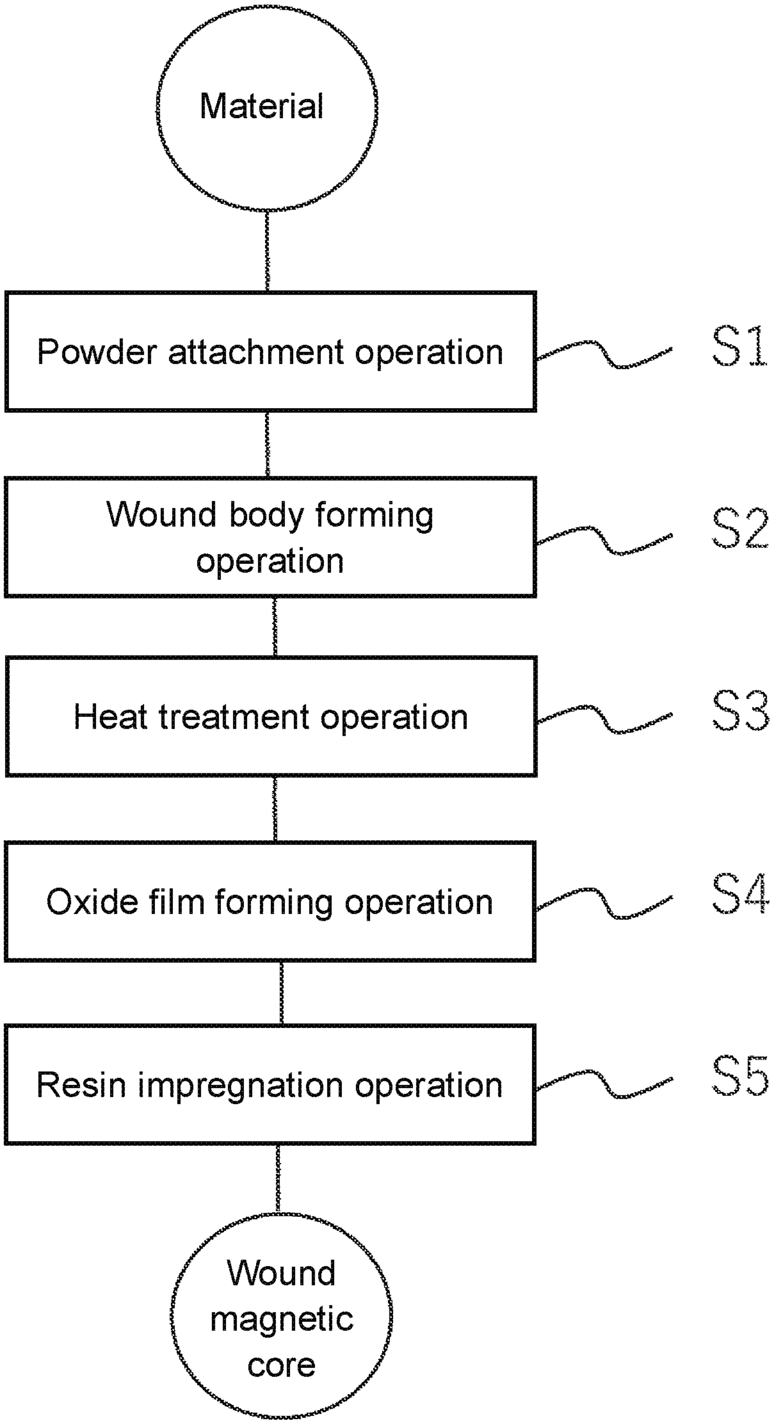
FIG. 1 Flowchart of operations for manufacturing a wound magnetic core associated with an embodiment of the present invention.

FIG. 1 is a flowchart of manufacturing operations at a method for manufacturing a wound magnetic core in accordance with the present invention. As shown in FIG. 1, at the first operation, using soft magnetic metal ribbon having an amorphous structure as material, a nonmagnetic insulating metal oxide powder is made to adhere to the surface of that material (powder attachment operation S1). At the second operation, the soft magnetic metal ribbon having the amorphous structure which was obtained at the foregoing first operation is wound in annular fashion so as to obtain a wound body of prescribed shape and size, to produce a wound body at which metal oxide powder intervenes between ribbon layers (wound body forming operation S2). At the third operation, the wound body is made to undergo heat treatment in a nonoxidizing atmosphere to cause formation of nanocrystal(s) at the foregoing soft magnetic metal ribbon having the amorphous structure and/or to relieve stresses at the foregoing soft magnetic metal ribbon having the amorphous structure (heat treatment operation S3). At the fourth operation, treatment for formation of an oxide film is carried out in an oxidizing atmosphere at a temperature adjusted so as to be lower than the temperature at which heat treatment was carried out during the foregoing heat treatment operation S3, to oxidize the surface of the soft magnetic metal ribbon (oxide film forming operation S4). At the fifth operation, the spaces between ribbon layers of the wound body which was obtained are impregnated with resin and the resin is cured to fuse the foregoing metal oxide powder thereto and form the wound magnetic core (resin impregnation operation S5).

The wound magnetic core of the present embodiment is a wound magnetic core in which soft magnetic metal ribbon is wound. The foregoing soft magnetic metal ribbon has an amorphous structure and/or a nanocrystalline structure. Formed at the surface of the foregoing soft magnetic metal ribbon is a layer of an oxide of a metal derived from a metal making up the foregoing soft magnetic metal ribbon. A nonmagnetic insulating metal oxide powder is fused by resin in the spaces between layers of the foregoing soft magnetic metal ribbon. Detailed description of the respective operations follows.

(1) Material

It is preferred that the soft magnetic metal ribbon having an amorphous structure which serves as material for the present embodiment be made up of soft magnetic alloy having Fe as primary constituent. This is typically a soft magnetic alloy in which Fe content is not less than 65 at %, there being no particular limitation with respect to the composition of the soft magnetic alloy apart from the fact that it should have Fe as primary constituent. While this will vary depending on the balance with any other, nonferrous metal(s) that may be present therein, so as to influence saturation magnetization and other such magnetic properties, it is preferred that Fe be present therein in an amount that is not less than 77.5 at %, and more preferred that this be not less than 78.0 at %. As soft magnetic metal ribbon having an amorphous structure made of such material, soft magnetic metal ribbon having an amorphous structure that when subjected to heat treatment will permit formation of a soft magnetic metal ribbon having a nanocrystalline structure may be employed.

The soft magnetic alloy ribbon which makes up the wound magnetic core has an amorphous structure and/or a nanocrystalline structure. The distinction between whether the soft magnetic metal ribbon has an amorphous structure or a nanocrystalline structure may be easily determined by identification based on the x-ray diffraction pattern thereof as obtained through use of x-ray diffraction. For example, the x-ray diffraction pattern of a ribbon having a nanocrystalline structure might exhibit a diffraction peak in a region (in the vicinity of diffraction angle $2\theta=45°$) indicative of presence of a crystalline phase, and the x-ray diffraction pattern of a ribbon having an amorphous structure might exhibit a halo pattern indicative of presence of an amorphous phase. The diffraction peak in the vicinity of diffraction angle $2\theta=45°$ is the (110) diffraction peak of crystalline FeSi or crystalline Fe having a bcc structure. The angle at which the diffraction peak occurs is such that the angle at which the diffraction peak occurs is subject to error due to such things as fluctuations with respect to data from JCPDS cards which may depend on elemental solubility and so forth. For this reason, angles ($2\theta$) of diffraction peaks that are in the immediate vicinities of those listed on the respective JCPDS cards are deemed to be "in the vicinity" thereof.

An amorphous structure does not possess a crystalline structure. On the other hand, a nanocrystalline structure will ordinarily have crystal grains which are such that average crystal grain diameter is not greater than 100 nm. Nanocrystalline structures are typically structures in which crystallization of the amorphous phase was initiated from crystallization nucleation site(s) in the form of Cu or other such nonferrous metal cluster(s). Nanocrystalline structures are grains of FeSi crystals or Fe crystals at which the average crystal grain diameter thereof might, for example, be not greater than 30 nm, the structure being such that nanocrystals are dispersed with random orientation throughout the amorphous phase therein. A nanocrystalline structure might be obtained by causing a soft magnetic metal ribbon having an amorphous structure which is capable of being made to undergo nanocrystallization to be subjected to heat treatment.

As soft magnetic metal ribbon having a nanocrystalline structure, an Fe—Si-M1-B—Cu soft magnetic alloy or an Fe-M2-B soft magnetic alloy might, for example, be employed, or another soft magnetic alloy may be employed. It is preferred that M1 be one or more species selected from among the group consisting of Nb, Ti, Zr, Hf, V, Ta, and Mo. Furthermore, it is preferred that M2 be one or more species selected from among the group consisting of Nb, Cu, Zr, and Hf. As Fe—Si-M1-B—Cu soft magnetic alloy, FINEMET (trademark registered in Japan) by Hitachi Metals, Ltd., and VITROPERM (trademark registered in Japan) by VACUUMSCHMELZE GmbH & Co. KG. being known, these may be employed. As Fe-M2-B soft magnetic alloy, NANOPERM (trademark registered in Japan) by MAGNETIC Gesellschaft fur Magnettechnologie mbH being known, this may be employed.

As soft magnetic metal ribbon having an amorphous structure, an Fe—Si—B soft magnetic alloy might, for example, be employed. As Fe—Si—B soft magnetic alloy, METGLAS (trademark registered in Japan) 2605SA1 by METGLAS, Inc., being known, this may be employed.

The soft magnetic metal ribbon may be obtained by the liquid quenching method in which an alloy melt is made to undergo rapid solidification. This might ordinarily be obtained by known liquid quenching methods referred to as the single-roller method or the twin-roller method which permit attainment of cooling rates of on the order of 106° C./second or higher. Such methods will permit formation of a long continuous soft magnetic metal ribbon.

As the soft magnetic metal ribbon, those having widths and thicknesses on the order of those which are commercially available may be used. Furthermore, soft magnetic metal ribbon of widths such as may be obtained by slitting soft magnetic metal ribbon of widths on the order of those which are commercially available may be used. As the soft magnetic metal ribbon, those having widths on the order of 2 mm to 300 mm might, for example, be used. Furthermore, it is preferred that thickness of the soft magnetic metal ribbon be not less than 10 μm but not greater than several hundred and from the standpoint of amorphous forming ability it is more preferred that thickness of the soft magnetic metal ribbon be not greater than 50 μm.

(2) Powder Attachment Operation S1

Soft magnetic metal ribbon which has been adjusted so as to be of prescribed width and length, and a nonmagnetic insulating metal oxide powder, are prepared. It is preferred that the metal oxide powder be any of magnesium oxide (MgO), titanium oxide ($TiO_2$), or aluminum oxide ($Al_2O_3$).

The metal oxide powder is made to adhere uniformly to the surface of the soft magnetic metal ribbon. Furthermore, to achieve adequate spacing between ribbon layers while achieving a suitable space factor at the wound magnetic core, it is preferred that average particle diameter (median diameter d50 of the cumulative particle size distribution) of the metal oxide powder be not less than 0.5 μm but not greater than 1.0 μm. Here, this is the value which is obtained by using a laser diffraction/scattering particle size distribution measuring device to carry out measurement of the metal oxide powder. Furthermore, considering the effect on stresses which may be produced at the ribbon, it is not preferred that coarse powder intervene between ribbon layers. It is preferred that the maximum particle diameter of the powder be not greater than 7 μm. What is referred to herein as maximum particle diameter indicates the 95 vol % particle diameter (d95).

The metal oxide powder is dispersed within toluene, isopropyl alcohol, ethanol, or other such solvent to form a liquid dispersion. By adjusting the concentration of the liquid dispersion, it is possible to adjust the amount of metal oxide powder which is made to adhere to the soft magnetic metal ribbon. While specific numeric values will vary depending on the tension acting on the soft magnetic metal ribbon at the time that it is made into a wound body, where the metal oxide is magnesium oxide (MgO), to achieve a space factor of not less than 65% at the wound magnetic core, it is preferred that 30 g to 200 g of MgO be present therein for every 1 kg of solvent. A liquid dispersion that has been adjusted so as to have the prescribed powder concentration is prepared, and the surface of the soft magnetic metal ribbon is coated therewith.

Figure 2:
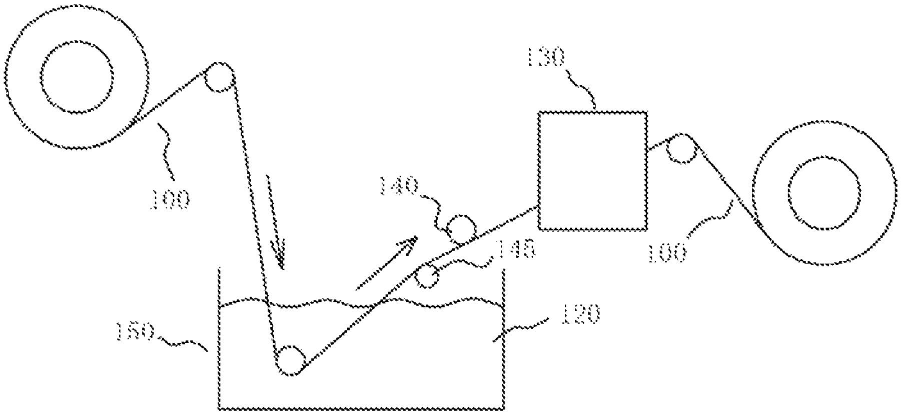
FIG. 2 Simplified diagram of a powder attachment device used to manufacture a wound magnetic core associated with an embodiment of the present invention.

FIG. 2 shows a simplified diagram of a powder attachment device that causes soft magnetic metal ribbon to be immersed in a liquid suspension and attached with metal oxide powder. The device shown in the drawing uses soft magnetic metal ribbon 100 in reel form. In addition, the end of soft magnetic metal ribbon 100 are detached therefrom and are immersed in container 150 which contains liquid suspension 120. Soft magnetic metal ribbon 100 is then lifted up and out of liquid suspension 120. In addition, soft magnetic metal ribbon 100 is made to pass by rod 145 which removes excess liquid suspension 120 from the roller side (or where the single-roller method is used to obtain soft magnetic metal ribbon 100, the side thereof that comes in contact with the cooling roller) of soft magnetic metal ribbon 100, and is made to pass by rotating scraper 140. This makes it possible to control the liquid suspension 120 on the free side (or where the single-roller method is used to obtain the soft magnetic metal ribbon, the side thereof that does not come in contact with the cooling roller) of soft magnetic metal ribbon 100. Soft magnetic metal ribbon 100 is then made to pass through drying oven 130 which has been adjusted so as to be at a prescribed temperature. Soft magnetic metal ribbon 100, the surface of which has been attached with a prescribed amount of metal oxide powder, is then taken up and wound into reel form. Besides immersing this in liquid suspension 120, a roll coater can be used to coat the surface of soft magnetic metal ribbon 100 with liquid suspension 120 or coating thereof may be carried out by spraying this thereon.

Figure 3A:
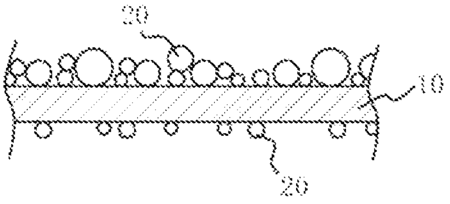
FIG. 3*a* Schematic sectional view of soft magnetic metal ribbon when in a state in which metal oxide powder adheres to the surface thereof.
Figure 3B:
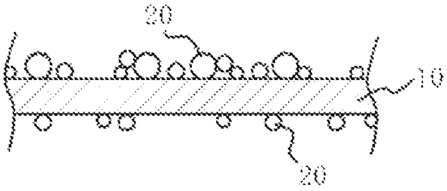
FIG. 3*b* Schematic sectional view of soft magnetic metal ribbon showing another state in which metal oxide powder might adhere to the surface thereof.

FIG. 3*a* and FIG. 3*b* show schematic sectional views of soft magnetic metal ribbon when in states in which metal oxide powder adheres to the surface thereof. While the soft magnetic metal ribbon may have depression(s) and/or protrusion(s), depressions and protrusions are not shown at FIG. 3*a* and FIG. 3*b*. As shown in FIG. 3*a*, after passing by rod 145, metal oxide powder 20 adheres more or less uniformly to the entire surface on one side (the free side; the top surface in the drawing) of soft magnetic metal ribbon 10, most of the metal oxide powder 20 having been removed from the surface on the other side (the roller side; the bottom surface in the drawing) thereof.

After the liquid suspension 120 on the one side of soft magnetic metal ribbon 10 has been subjected to control by scraper 140, the amount of metal oxide powder 20 that adheres to the surface on the one side (the free side; the top surface in the drawing) of soft magnetic metal ribbon 10 is reduced as shown in FIG. 3*b*. While this will vary depending on the metal oxide powder employed, it is preferred that the amount of metal oxide powder 20 adhering thereto be such that when the metal oxide is expressed as a wt % ratio this is not less than 0.1% but not greater than 1.2% thereof. It is preferred that the amount of metal oxide powder 20 adhering thereto be not less than 0.2% thereof, and more preferred that this be not less than 0.3% thereof. Furthermore, it is preferred that the amount of metal oxide powder 20 adhering thereto be not greater than 1.1% thereof, and more preferred that this be not greater than 1.0% thereof. Where the metal oxide is MgO, it is preferred that the amount of metal oxide powder 20 adhering thereto per unit area be not less than $0.1\times10^{-3}$ kg/m$^2$ thereof but not greater than $1.5\times10^{-3}$ kg/m$^2$ thereof.

The metal oxide powder 20 that adheres to the surface of soft magnetic metal ribbon 10 comes off easily therefrom by an action as gentle as when this is rubbed lightly with the fingers. For this reason, during transport of soft magnetic metal ribbon 10 within mechanical equipment following drying thereof, there is a tendency for metal oxide powder 20 to adhere to and/or accumulate on parts, especially parts such as transport rollers and the like, that come in contact with soft magnetic metal ribbon 10. As a result, it is sometimes the case that problematic situations or the like occur which may cause transport to become unstable. Furthermore, where metal oxide powder 20 is shed therefrom, this will cause the amount of metal oxide powder 20 that adheres to soft magnetic metal ribbon 10 to be different at the start of powder attachment than it is at the end of powder attachment. As a result, it may sometimes be difficult to cause metal oxide powder 20 to adhere uniformly thereto.

For this reason, it is preferred that the amount of metal oxide powder 20 adhering to the surface on one side (e.g., the roller side) of soft magnetic metal ribbon 10, i.e., the side thereof that comes in contact with mechanical equipment parts, be reduced. Furthermore, the surface of the one side of soft magnetic metal ribbon 10 may also be made to assume a state such that no metal oxide powder 20 adheres thereto.

After metal oxide powder 20 has been made to adhere thereto, metal oxide powder 20 may be removed from the surface on the one side of soft magnetic metal ribbon 10 so as to cause the amount of metal oxide powder 20 adhering thereto to be reduced, or this may also be made to assume a state such that no metal oxide powder 20 adheres thereto.

Furthermore, where the single-roller method is used to obtain soft magnetic metal ribbon, that surface conditions on the side (roller side) of the soft magnetic metal ribbon that comes in contact with the cooling roller versus those on the side (free side) thereof that does not come in contact therewith are different is known. At the roller side, there is a tendency for depressions having depths of on the order of several μm to a dozen or so μm to form due to entrainment of the gas atmosphere employed during casting or adhesion of foreign objects thereto and/or scratches from the cooling roller. At the free side, there is a tendency for protrusions having heights of on the order of 10 μm or less to form.

Because protrusions affect the short circuits that may form between ribbon layers, considering the surface conditions at the soft magnetic metal ribbon, it is preferred that metal oxide powder 20 be made to adhere to at least the free side of the soft magnetic metal ribbon.

(3) Wound Body Forming Operation S2

The soft magnetic metal ribbon in reel form, on which metal oxide powder adheres at the surface thereof, is mounted on a rewinding device and the end of the soft magnetic metal ribbon is pulled out therefrom and is wrapped tightly about a support body (spool) while tension is applied thereto to produce an annular wound body at which multiple layers of soft magnetic metal ribbon are layered in the radial direction of the winding. It is preferred that that the soft magnetic metal ribbon be wound thereon at a speed which is not less than 10 m/minute but not greater than 500 m/minute. While a variety of dimensions are possible for the wound body, it is for example preferred that the inside diameter thereof be not less than 5 mm but not greater than 140 mm, and that the outside diameter thereof be not less than 20 mm but not greater than 200 mm.

The support body is removed from the wound body, and the end of the soft magnetic metal ribbon where the winding begins and the end thereof where the winding ends are secured by spot welding to form the final wound body. Because the metal oxide powder causes the soft magnetic metal ribbon to have good lubricity, it can be wound into a neat roll, and it excels with respect to ease of operations due to the fact that tension can be easily adjusted during winding. As a result, it is possible to form a wound body in which there is little variation in the spacing between ribbon layers over the entire roll from the inner circumferential surface to the outer circumferential surface.

Figure 4:
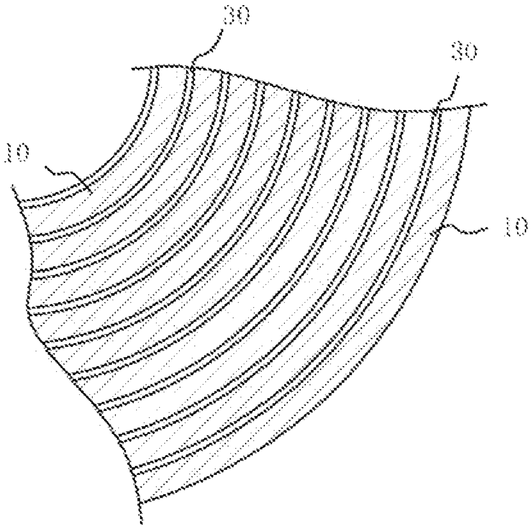
FIG. 4 Enlarged schematic diagram of a section perpendicular to the axis of the winding showing a situation that might exist between ribbon layers in a winding body.

FIG. 4 is a schematic diagram of a section perpendicular to the axis of the winding showing a situation that might exist between ribbon layers in a winding body. The spaces between layers of soft magnetic metal ribbon 10 are made up of air layers 30 in which metal oxide powder 20 intervenes. While not shown at FIG. 4, among the particles making up metal oxide powder 20 which is present between the ribbon layers, those particles that are of large size are sandwiched between ribbon layers, and the majority of the particles continue to adhere to the surface on one side of soft magnetic metal ribbon 10.

The spacing between ribbon layers may be adjusted depending on the tension which is applied to soft magnetic metal ribbon 10 at the time that this is made into a wound body, the state of any surface irregularity that may exist at soft magnetic metal ribbon 10, and/or the thickness of metal oxide powder 20 at the surface of soft magnetic metal ribbon 10. But note that the larger the spacing between ribbon layers the greater will be the tendency for there to be a decrease in the space factor of the wound magnetic core and for the desired magnetic properties to become unattainable. Furthermore, considering supplying oxygen to the spaces between ribbon layers during formation of the oxide film on the surface of the soft magnetic metal ribbon, described below, it is preferred that the metal oxide powder 20 and/or the conditions under which the wound body is formed be chosen as appropriate so as to cause the space factor of the wound magnetic core to be not less than 65% but not greater than 75% and/or so as to cause the spacing between ribbon layers to be not less than 0.2 μm at the smallest.

(4) Heat Treatment Operation S3

Next, by causing the wound body to undergo heat treatment at a prescribed temperature in a nonoxidizing atmosphere, stresses that may have been imparted thereto during formation of the wound body are relieved, and/or nanocrystallization is carried out so as to achieve desired magnetic properties. The nonoxidizing atmosphere may be a $N_2$, Ar, or other such inert gas atmosphere in which oxygen concentration is not greater than 100 ppm.

While this will vary depending on alloy composition, where the soft magnetic metal ribbon has an amorphous structure, it is preferred that heat treatment be carried out at a temperature of not less than 250° C. in a nonoxidizing atmosphere to relieve stresses. Because increasing the temperature of the soft magnetic metal ribbon to a temperature that is too high will cause initiation of crystallization, it is preferred that the heat treatment temperature be 10° C. to 150° C. lower than the crystallization temperature of the alloy, it typically being preferred that this be not greater than 400° C. Where METGLAS (trademark registered in Japan) 2605SA1 is for example employed, it is preferred that the heat treatment temperature be 340° C. to 400° C. The heat treatment temperature is the maximum temperature reached when temperature is increased. Where the heat treatment temperature is such that this temperature is maintained for a prescribed period of time, it may also be considered to be the temperature at which this is maintained.

Furthermore, where formation of nanocrystal(s) at the soft magnetic metal ribbon is made to occur and a soft magnetic metal ribbon having a nanocrystalline structure is formed, it is preferred that heat treatment be carried out at a temperature that is not less than the crystallization temperature of the soft magnetic alloy that makes up the soft magnetic metal ribbon. If temperature is increased too much, this may cause increase in crystallomagnetic anisotropy and formation of crystalline phases such as $Fe_2B$ that can adversely affect soft magnetic properties. It is therefore preferred that the heat treatment temperature be not less than the crystallization temperature of the alloy and be within a range that is not less than 500° C. but not greater than 620° C., and preferably within a range that is not less than 540° C. but not greater than 590° C.

Nanocrystalline structures are structures in which Fe crystal and/or FeSi crystal nanocrystalline grains are dispersed with random orientation throughout an amorphous phase. It is preferred that the average crystal grain diameter of nanocrystalline grains be not greater than 30 nm, and more preferred that this be not greater than 20 nm. The average crystal grain diameter of nanocrystalline grains is the size of crystallites as calculated by the formula of Scherrer using the difference from the width of the bccFe(Si) [(110) scattering plane] peak in the x-ray diffraction pattern.

Furthermore, it is preferred that the nanocrystalline structure be such that nanocrystalline grains make up not less than 30 vol % thereof, and more preferred that this be not less than 50 vol % thereof. The volume fraction of nanocrystalline grains in the nanocrystalline structure is calculated using the line segment method. Moreover, it is known that there will be contraction of on the order of 1% of the volume of the soft magnetic metal ribbon when crystallization is made to occur at a soft magnetic metal ribbon having an amorphous structure which is made to undergo heat treatment so as to cause formation of a nanocrystalline structure. Because the fact that metal oxide powder intervenes between ribbon layers tends to increase lubricity in the circumferential direction in which the soft magnetic metal ribbon is wound, the neat roll into which the wound body can be wound when contraction occurs will make it possible to suppress stresses that might otherwise act on the soft magnetic metal ribbon.

It is preferred that heat treatment time be not less than 5 minutes but not greater than 14 hours, with no distinction being made as to whether this is for stress relief and/or for nanocrystallization. Heat treatment time is the period of time during which the maximum temperature reached is maintained. So long as the oven used for heat treatment is a heating oven permitting control of temperature to a temperature in the vicinity of 620° C. in a nonoxidizing atmosphere, anything may be used without any particular problem. If it is a heating oven permitting control of oxygen concentration, as this will make it possible for the same heating oven to also be used during the oxide film forming operation S4 which follows, which will make it possible to carry out processing in continuous fashion, this is even more preferred.

(5) Oxide Film Forming Operation S4

Following heat treatment operation S3, the wound body is subjected to treatment for formation of an oxide film in an oxidizing atmosphere, preferably an atmosphere in which oxygen concentration is not less than 1% but not greater than 50%, at a temperature that is not less than 240° C. but that is below the heat treatment temperature (maximum temperature reached) during the heat treatment operation S3, to form an oxide film on the surface of the soft magnetic metal ribbon. It is preferred that oxygen concentration within this atmosphere be not greater than 50 vol %, and it is more preferred that the oxidizing atmosphere be a normal air atmosphere.

The wound body is provided with air layers 30 formed as a result of the fact that metal oxide powder 20 intervenes between layers of soft magnetic metal ribbon 10. This treatment for formation of an oxide film also causes oxygen to be supplied to air layers 30. As a result, not only is an oxide film formed on the surface of the soft magnetic metal ribbon that is apparent at the outer surface of the wound body, but an oxide film is also formed on the surface of the soft magnetic metal ribbon that is wound up therewithin.

It is preferred that the thickness of the oxide film be a thickness which is on the order of that which will improve insulation between ribbon layers and make it possible to suppress worsening of magnetic properties of the wound magnetic core, and which is greater than the thickness (up to on the order of a dozen or so nm) of an oxide film formed by natural oxidation and which is several tens of nm to several hundred nm. Thickness of the oxide film may be quantitatively determined by using transmission electron microscopy (TEM) to carry out observation at a magnification of 50 k to 200 k. Furthermore, thickness of the oxide film may be quantitatively determined by using x-ray photoelectron spectroscopy (XPS) or another such technique.

Furthermore, it is preferred that the oxide film be a layer of an oxide of a metal derived from a metal making up the soft magnetic metal ribbon, and that it be hematite ($Fe_2O_3$) and/or magnetite ($Fe_3O_4$). The oxide film may contain wustite (FeO). Note, however, that because the resistance of wustite is lower than that of hematite and magnetite, it is preferred that the amount of wustite which is present therein be small.

Identification of the oxide may be carried out using Raman spectroscopy or another such analytic technique. Following formation of the oxide film, the metal oxide powder between ribbon layers continues to adhere to the surface of the soft magnetic metal ribbon in the same fashion as during formation of the wound body. Where the soft magnetic metal ribbon has a nanocrystalline structure, it is preferred that the oxide film forming temperature be within a range that is not less than 240° C. but not greater than 350° C. Furthermore, where the soft magnetic metal ribbon has an amorphous structure, it is preferred that the heat treatment temperature be within a range that is not less than 240° C. but not greater than 300° C.

(6) Resin Impregnation Operation S5

Following the oxide film forming operation S4, the surface of the wound body which was obtained and the spaces between ribbon layers at the soft magnetic metal ribbon are impregnated with insulating resin and the insulating resin is cured to form the wound magnetic core. The adhesion between ribbon layers which is produced by the insulating resin causes the magnetic alloy ribbon to become an integral structure and prevents the soft magnetic metal ribbon that is in a wound body state from coming undone as a result of action of an external force or the like. This makes it possible for the wound body state thereof to be maintained. Furthermore, using insulating resin to produce adhesion between ribbon layers causes the metal oxide powder between ribbon layers to be fused thereto and also contributes to insulation between layers. Note that it is preferred that the surface of the soft magnetic metal ribbon be evenly covered with insulating resin. Between ribbon layers at the wound body, it is at least preferred that not less than 3% of the surface of the soft magnetic metal ribbon be covered with insulating resin.

It is preferred that epoxy-type and/or polyimide-type thermosetting resin be used as the insulating resin. As method for causing the spaces between ribbon layers of the wound body to be impregnated with insulating resin, impregnation may be carried out by causing the wound body to be immersed in a tub of insulating resin, or impregnation may be carried out by causing insulating resin or a precursor thereof to be applied to the side face(s) that are apparent in the direction of the axis of the winding of the wound body. Furthermore, vacuum impregnation or other such method may be utilized to promote impregnation of the spaces between ribbon layers of the wound body by the insulating resin. To cause the thermosetting resin and/or precursor thereof with which the surface of the wound body and the spaces between ribbon layers have been coated to be cured, curing treatment is carried out at prescribed temperature. While the curing treatment temperature will vary depending on the resin employed, it is preferred where epoxy-type resin is employed that curing be carried out for 1 minute to 24 hours at a temperature of 20° to 180° C.

WORKING EXAMPLES

Working Example 1

As the soft magnetic metal ribbon which served as material, FINEMET (trademark registered in Japan) FT-3 manufactured by Hitachi Metals, Ltd., which is a soft magnetic metal ribbon having an amorphous structure made up of a soft magnetic alloy having Fe as primary constituent and containing Si and B and trace amounts of Cu and Nb, and which when subjected to heat treatment permits formation of nanocrystals, was prepared. The soft magnetic metal ribbon that was used was long, thickness thereof being 14 μm, and width thereof being 20 mm. Density of the soft magnetic metal ribbon was $7.3\times10^3$ kg/m$^3$. By using a differential scanning calorimeter (DSC) to perform measurements, it was found that the temperature at which crystallization of this alloy was initiated was 470° C.

At powder attachment operation S1, the metal oxide powder was made to adhere to the surface of the soft magnetic metal ribbon. As the nonmagnetic insulating metal oxide powder, magnesium oxide (MgO) powder having an average particle diameter (d50) of 0.7 μm was prepared. Density of the magnesium oxide was $3.6\times10^3$ kg/m$^3$. Using isopropyl alcohol as solvent, 100 g of magnesium oxide powder was dispersed within 1 kg of solvent to prepare a liquid dispersion 120. The liquid suspension 120 was transferred to the container 150 of the powder attachment device shown in FIG. 2, the soft magnetic metal ribbon 100 was immersed for 0.5 second in the liquid suspension while causing agitation of the liquid suspension 120 so as to prevent flocculation or precipitation of magnesium oxide within the liquid suspension 120. The soft magnetic metal ribbon 100 was lifted up and out of the liquid suspension 120, and was made to pass by a rod 145 which removed excess liquid suspension 120 from the roller side of the soft magnetic metal ribbon, and was made to pass by a rotating scraper 140, the excess liquid suspension 120 present on the surface of the soft magnetic metal ribbon being removed therefrom such that the liquid suspension 120 on the free side thereof was controlled. The soft magnetic metal ribbon on which the liquid suspension 120 was present was then made to pass through a drying oven 130 which had been adjusted so as to be at a temperature of 80° C. to obtain soft magnetic metal ribbon 100 which had a prescribed amount of MgO powder adhering to the surface thereof.

The amount of MgO powder adhering to the surface of the soft magnetic metal ribbon was expressed as an MgO wt % ratio (metal oxide powder wt % ratio) as calculated using the following formula. The MgO wt % ratio was 0.73%.

MgO wt % ratio=(weight of MgO adhering to soft magnetic metal ribbon/weight of soft magnetic metal ribbon)×100(%)

Note that the weight of soft magnetic metal ribbon was the weight A of one reel worth of soft magnetic metal ribbon as it existed prior to powder attachment operation S1, and the weight of MgO adhering to soft magnetic metal ribbon was the weight which was calculated as the weight B of one reel worth of soft magnetic metal ribbon as it existed following powder attachment operation Si less the foregoing weight A.

At wound body forming operation S2, a wound body of the soft magnetic metal ribbon which had a prescribed amount of metal oxide powder adhering to the surface thereof was formed. The soft magnetic metal ribbon obtained at the powder attachment operation S1 was mounted on a rewinding device and the end of the soft magnetic metal ribbon was pulled out therefrom and was wrapped tightly about a support body made of stainless steel, the soft magnetic metal ribbon being wound thereabout in such fashion as to produce multiple layers in the radial direction of the winding. The support body was removed from the wound body, and the ends of the soft magnetic metal ribbon where the winding of the soft magnetic metal ribbon began and ended were secured by spot welding to form a wound body having an inside diameter of 33 mm and an outside diameter of 50 mm.

The wound body was made to undergo heat treatment at heat treatment operation S3, nanocrystallization being made to occur such that the amorphous structure of the soft magnetic metal ribbon was made to be a nanocrystalline structure. The wound body was made to undergo heat treatment under conditions (in accordance with a temperature profile) such that maximum temperature was 580° C. and the time this was maintained was 20 minutes in a nitrogen atmosphere within an electric oven to cause the soft magnetic metal ribbon that had an amorphous structure to become a soft magnetic metal ribbon having a nanocrystalline structure.

Transmission electron microscopy (TEM) was employed to observe the structures of samples obtained from the soft magnetic metal ribbon having the nanocrystalline structure at a magnification of 20,000×. An arbitrary line of length Lt was drawn on the photomicrographs obtained by transmission electron microscopy, the sum Lc of lengths of portions at which the line intersected nanocrystalline grain(s) of size(s) capable of being visually recognized was determined, and the fractional percentage LL=Lc/Lt of crystalline grains along the line was calculated. This procedure was repeated five times, the average value of LL being used to calculate the volume fraction VL of nanocrystalline grains. Here, volume fraction VL=Vc/Vt (where Vc is the total volume of nanocrystalline grains, and Vt is the volume of the sample) was approximated by $VL=Lc^3/Lt^3=LL^3$. The soft magnetic metal ribbon was such that the average crystal grain diameter thereof was 10 nm as determined by x-ray diffraction of nanocrystalline grains, and the volume fraction VL occupied by nanocrystalline grains in the nanocrystalline structure was 80 vol %.

At oxide film forming operation S4, the wound body from heat treatment operation S3 was made to undergo heat treatment so as to cause an oxide film to be formed at the surface of the soft magnetic metal ribbon. The wound body that had been made to undergo heat treatment such that nanocrystallization was made to occur was subjected to heat treatment under conditions (in accordance with a temperature profile) such that maximum temperature was 280° C. and the time this was maintained was 2 hours in a normal air atmosphere within an electric oven to cause an oxide film to be formed at the surface of the soft magnetic metal ribbon. A portion of the soft magnetic metal ribbon was detached from the outer circumferential surface of the wound body, and Raman spectroscopic analysis as well as observations of cross-sections using transmission electron microscopy (TEM) were carried out, as a result of which it was found that the oxide film which was formed at the surface of the soft magnetic metal ribbon of the wound body that was obtained was primarily hematite ($Fe_2O_3$). It was also found that the oxide film which was formed was thicker than that which was present at the surface of the soft magnetic metal ribbon before the metal oxide powder was made to adhere thereto.

Following the oxide film forming operation S4, the wound body was impregnated with resin. The wound body on which the oxide film was formed was immersed for 1 minute in an impregnation solution in which epoxy resin was diluted in acetone so as to achieve a concentration of 5% to 30%, following which the epoxy resin was cured in a constant-temperature bath at a temperature that had been adjusted so as to be 150° C. to obtain a wound magnetic core having a space factor of 70%. Note that the space factor was calculated as follows.

$$\text{Space factor}=[(We/p)/\{(OD^2-ID^2)\times HT\times pi/4\}]\times100\ (\%)$$

. . . where:

We=Weight of wound body following formation of oxide film (g);

p=Density of soft magnetic metal ribbon (g/cm$^3$);

OD=Outside diameter of wound body following formation of oxide film (cm);

ID=Inside diameter of wound body following formation of oxide film (cm); and

HT=Height of wound body following formation of oxide film (cm).

Figure 7:
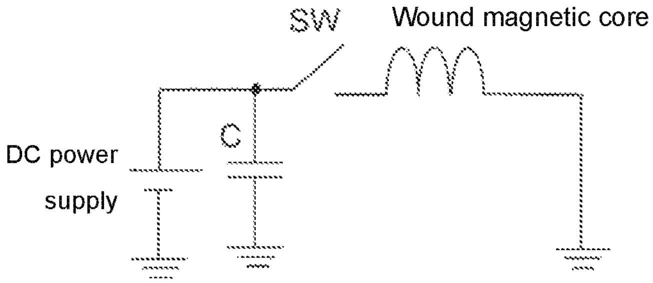
FIG. 7 Circuit diagram for explaining impulse testing.

The wound magnetic core obtained as a result of carrying out resin impregnation operation S5 was made to undergo impulse testing using the circuit shown in FIG. 7 under conditions such that peak voltage was 1.6 kV and pulsewidth was 200 nsec. Impedance was measured before and after testing, insulation of the wound magnetic core being evaluated based on the change in impedance thereof. Note that impedance was measured by inserting a coil which made one turn within the inside diameter of the wound magnetic core, impedance being evaluated using an HP4194A impedance analyzer at frequencies of 1 kHz to 10 MHz, and the percent change in impedance before versus after testing being calculated using the following formula.

Percent change in impedance={(impedance before impulse testing−impedance after impulse testing)/impedance before impulse testing}×100(%)

Furthermore, the wound magnetic core that was made to undergo impulse testing was also evaluated with respect to direct current resistance Rdc before and after impulse testing by using a HIOKI 3227 direct current resistometer between the inner circumferential surface thereof and the outer circumferential surface thereof. Direct current resistance Rdc before testing was 161Ω; direct current resistance Rdc after testing was 81Ω.

Comparative Example 1

Except for the fact that metal oxide powder was not made to adhere to the surface of the soft magnetic metal ribbon, and the fact that formation of an oxide film on the surface of the soft magnetic metal ribbon was not carried out, a wound magnetic core was fabricated using a procedure and conditions identical to those at Working Example 1. The space factor was 73.8%. The wound magnetic core that was obtained was made to undergo impulse testing, and the direct current resistance Rdc and percent change in impedance before and after testing were evaluated. Direct current resistance Rdc before testing was 34Ω; direct current resistance Rdc after testing was 1.7Ω.

Comparative Example 2

Except for the fact that metal oxide powder was not made to adhere to the surface of the soft magnetic metal ribbon, a wound magnetic core was fabricated using a procedure and conditions identical to those at Working Example 1. The space factor was 73.7%. Furthermore, the wound magnetic core that was obtained was made to undergo impulse testing, and the direct current resistance Rdc and percent change in impedance before and after testing were evaluated. Direct current resistance Rdc before testing was 92Ω; direct current resistance Rdc after testing was 2.1Ω.

Comparative Example 3

Except for the fact that formation of an oxide film on the surface of the soft magnetic metal ribbon was not carried out, a wound magnetic core was fabricated using a procedure and conditions identical to those at Working Example 1. The space factor was 72.8%. Furthermore, the wound magnetic core that was obtained was made to undergo impulse testing, and the direct current resistance Rdc and percent change in impedance before and after testing were evaluated. Direct current resistance Rdc before testing was 105Ω; direct current resistance Rdc after testing was 4.4Ω.

Figure 5:
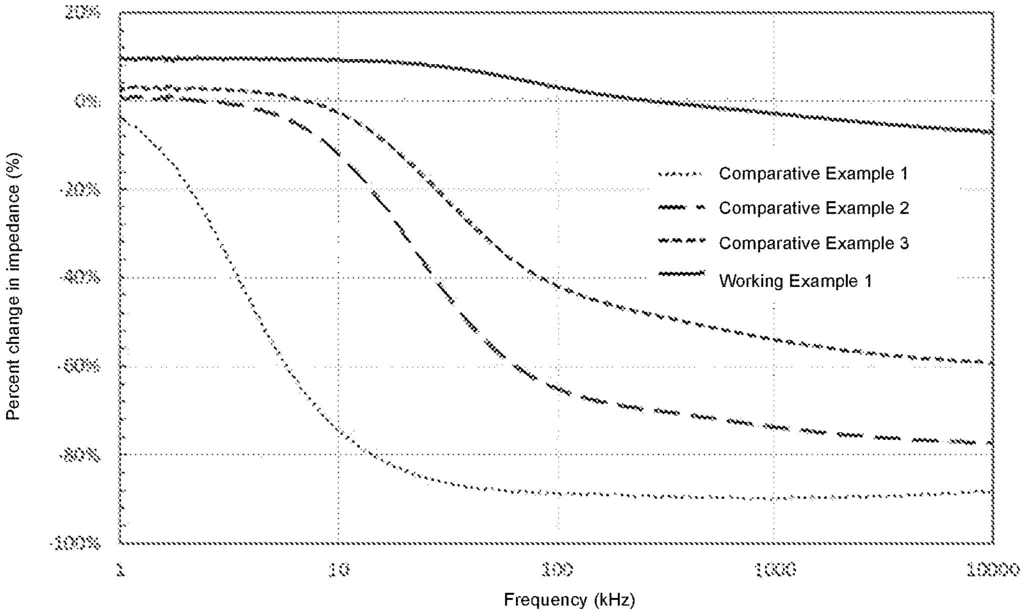
FIG. 5 Drawing showing relationship between frequency and percent change in impedance as calculated based on impedances before and after impulse testing of wound magnetic cores.

The relationship between frequency and percent change in impedance as calculated based on impedances before and after impulse testing is shown in FIG. 5. As compared with the wound magnetic cores of Comparative Examples 1 through 3, the wound magnetic core of Working Example 1 was such that direct current resistance Rdc before and after testing was high, and change in impedance in the high-frequency domain was suppressed.

Working Examples 2-6

Except for the fact that the amount of metal oxide powder that was made to adhere to the surface of the soft magnetic metal ribbon was adjusted by adjusting the concentration of the liquid suspension 120, a wound magnetic core was fabricated using a procedure and conditions identical to those at Working Example 1. The wound magnetic core that was obtained was made to undergo impulse testing, and the direct current resistance Rdc and percent change in impedance at a frequency of 1 MHz before and after testing were evaluated.

Comparative Examples 4-8

Except for the fact that the amount of metal oxide powder that was made to adhere to the surface of the soft magnetic metal ribbon was adjusted by adjusting the concentration of the liquid suspension 120, and the fact that formation of an oxide film on the surface of the soft magnetic metal ribbon was not carried out, a wound magnetic core was fabricated using a procedure and conditions identical to those at Working Example 1. The wound magnetic core that was obtained was made to undergo impulse testing, and the direct current resistance Rdc and percent change in impedance before and after testing were evaluated.

Figure 6:
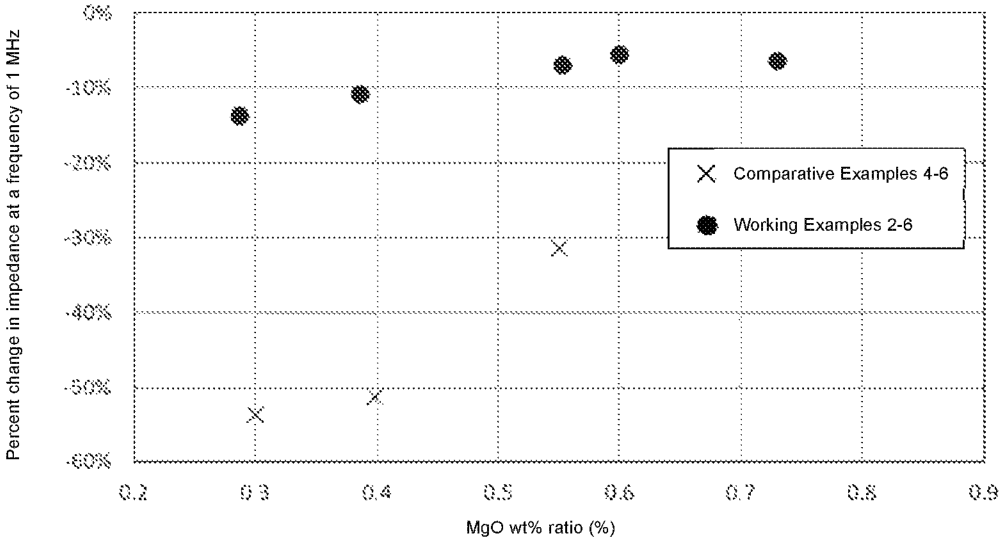
FIG. 6 Drawing showing percent change in impedance before and after impulse testing as a function of amount of metal oxide powder adhering thereto (MgO wt % ratio).

The space factor, percent change in weight before and after oxide film formation, impedance, and direct current resistance Rdc before and after impulse testing of the wound magnetic cores at Working Examples 2-6 and Comparative Examples 4-6 are shown at TABLE 1. Furthermore, the relationship between amount of metal oxide powder adhering thereto (MgO wt % ratio) and percent change in impedance before and after impulse testing are shown in FIG. 6.

TABLE 1

| | | | DC resistance Rdc (Ω) | | Impedance at 1 MHz | | |
|---|---|---|---|---|---|---|---|
| | MgO wt % ratio (%) | Space factor (%) | Before testing | After testing | Before testing (Ω) | After testing (Ω) | Percent change |
| Working Example 2 | 0.29 | 70.1 | 173 | 30 | 69.3 | 59.9 | −14% |
| Working Example 3 | 0.73 | 67.3 | 160 | 54 | 65.4 | 61.2 | −6% |

TABLE 1-continued

| | MgO wt % ratio (%) | Space factor (%) | DC resistance Rdc (Ω) Before testing | DC resistance Rdc (Ω) After testing | Impedance at 1 MHz Before testing (Ω) | Impedance at 1 MHz After testing (Ω) | Impedance at 1 MHz Percent change |
|---|---|---|---|---|---|---|---|
| Working Example 4 | 0.39 | 72.9 | 178 | 38 | 67.6 | 60.3 | −11% |
| Working Example 5 | 0.55 | 69.5 | 155 | 45 | 66.7 | 62.0 | −7% |
| Working Example 6 | 0.60 | 68.6 | 156 | 51 | 67.4 | 63.7 | −6% |
| Comparative Example 4 | 0.55 | 69.7 | 115 | 12 | 72.0 | 49.4 | −31% |
| Comparative Example 5 | 0.30 | 72.0 | 99 | 1 | 67.9 | 31.4 | −54% |
| Comparative Example 6 | 0.40 | 70.4 | 98 | 3 | 66.0 | 32.1 | −51% |

Each of the wound magnetic cores at Working Examples 2-6 exhibited a small change in impedance before and after impulse testing, and was such that the absolute value of the percent change in impedance was not greater than 20%. Furthermore, direct current resistance Rdc was also maintained, being high following impulse testing. Even where a small amount of metal oxide powder was made to adhere to the surface of the soft magnetic metal ribbon, it was possible to obtain superior insulating performance.

What is claimed is:

1. A wound magnetic core in which a soft magnetic metal ribbon is wound, the wound magnetic core being such that:

the soft magnetic metal ribbon has an amorphous structure and/or a nanocrystalline structure;

a layer of an oxide of Fe derived from a metal making up the soft magnetic metal ribbon is present at a surface of the soft magnetic metal ribbon;

spaces between layers of the soft magnetic metal ribbon have a nonmagnetic insulating metal oxide powder in intervening fashion and are impregnated with a resin; and a space factor of the wound magnetic core is not less than 65% but not greater than 75%.

2. The wound magnetic core according to claim 1, wherein:

the Fe oxide layer comprises hematite ($Fe_2O_3$).

3. The wound magnetic core according to claim 1, wherein:

an absolute value of a percent change in impedance at a frequency of 1 MHz as obtained using a following formula (2) is not greater than 20%; and percent change in impedance (%)={(impedance before impulse testing-impedance after impulse testing)/impedance before impulse testing}×100 (2).

4. The wound magnetic core according to claim 1, wherein:

the Fe oxide layer comprises hematite ($Fe_2O_3$);

an absolute value of a percent change in impedance at a frequency of 1 MHz as obtained using a following formula (2) is not greater than 20%; and percent change in impedance (%)={(impedance before impulse testing-impedance after impulse testing)/impedance before impulse testing}×100 (2).

5. The wound magnetic core according to claim 1, wherein:

the metal oxide is magnesium oxide (MgO), titanium oxide ($TiO_2$), or aluminum oxide ($Al_2O_3$).

* * * * *